Patented Oct. 5, 1948

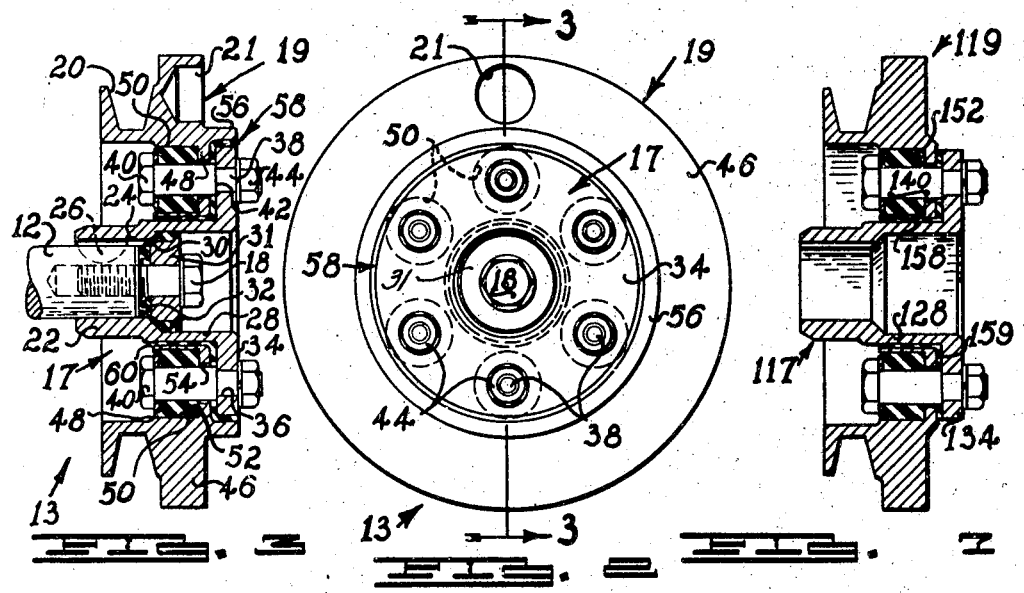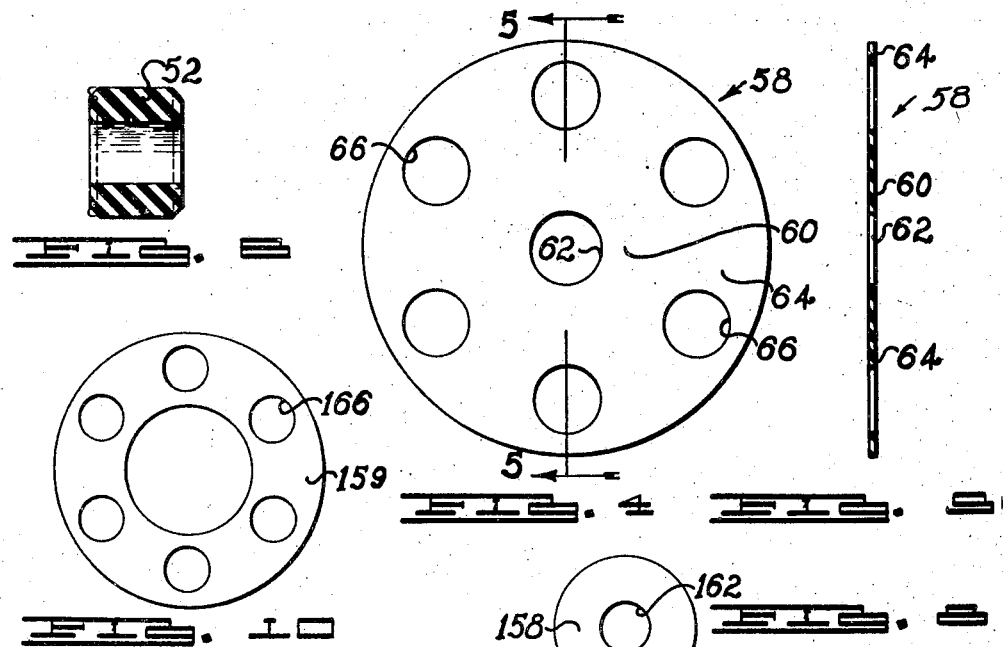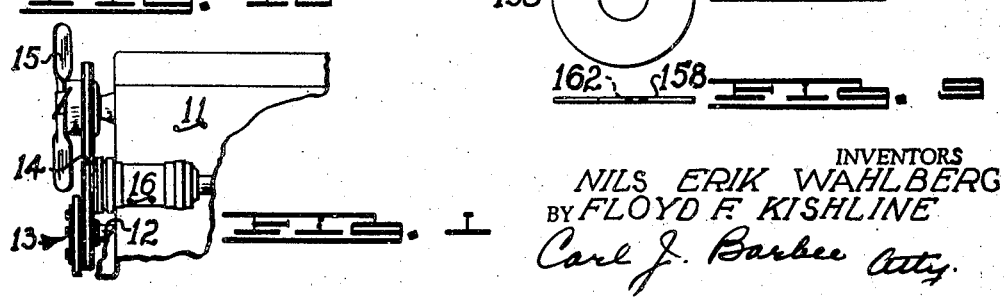

2,450,701

UNITED STATES PATENT OFFICE 2,450,701

VIBRATION DAMPENER

Nils Erik Wahlberg and Floyd F. Kishline, Kenosha, Wis., assignors to Nash-Kelvinator Corporation, Kenosha, Wis., a corporation of Maryland Application July 11, 1941, Serial No. 401,982

13 Claims. (Cl. 74—574)

This invention relates to vibration dampeners and has particular reference to means for dampening or reducing the amplitude of the torsional vibrations in the crank shaft of an internal combustion motor.

It has been known for some time that when the crank shaft of an internal combustion motor is subjected to the repeated thrusts of the connecting rods of the motor, torsional vibrations of a harmonic character are set up which alternately cause the crank shaft to accelerate above and decelerate below the average angular speed of the crank shaft. These vibrations are transmitted through the bearings to the motor causing undesirable vibrations in the motor and automobile.

In order to overcome this undesirable vibration, dampeners have been applied to the crank shaft, usually on the opposite end of the shaft from the flywheel where the amplitude of the vibrations is greatest. These dampeners have been statically unbalanced with respect to the axis of the shaft to obtain an over-all static balance of the shaft and dampener.

The simplest of these dampeners have consisted of an annular inertia member mounted on a hub in generally concentric relationship with respect to the axis of the crank shaft. The inertia members have been connected to the hubs by means of rubber bonded between the two members both in axial and radial relationship with respect to the crank shaft to support the inertia members by either compression loads or shear loads in the rubber. The inertia members have also been mounted to rotate on the hub and restrained against rotation by spring or friction connections to the hub.

Due to the eccentric weight distribution of the inertia members, they have been liable to oscillate radially in their plane of rotation about the crank shaft, thus imparting undesirable transverse loads to the shaft and wearing out the connecting members. This has been true even in dampeners in which the inertia member is in direct contact with the hub due to the necessary clearance between the hub and inertia member.

It is therefore an object of this invention to provide means for mounting the inertia member of a vibration dampener on the hub of the dampener in such a manner that the inertia member will not oscillate transversely with respect to the hub.

It is another object of this invention to provide mounting means for an inertia member which is connected to the hub of a vibration dampener to transmit torsional loads thereto through rubber, which mounting means will prevent the inertia member from oscillating in a plane transverse to the axis of rotation of the dampener.

It is another object of this invention to provide mounting means for an inertia member which is connected to the hub of a vibration dampener to transmit torsional loads thereto through a friction connection, which mounting means will prevent the inertia member from oscillating in a plane transverse to the axis of rotation of the dampener.

It is another object of this invention to provide a single insulating member which will insulate an inertia member from the hub of a vibration dampener and transmit torsional vibrations to the inertia member by means of shear loads in the insulator member.

It is another object of this invention to provide a vibration dampener in which the inertia member is more securely fastened to the hub of the dampener than in other vibration dampeners known heretofore.

It is another object of this invention to provide a vibration dampener in which the inertia member is more perfectly insulated from the hub of the dampener than in similar dampeners known heretofore.

It is another object of this invention to provide a vibration dampener in which the insulating material between the hub and the inertia member is pre-loaded or stressed by the assembly of the members.

Other objects and advantages of this invention will be apparent from a consideration of the following description and claims and the attached drawings, of which there is one sheet, and in which—

Figure 1 represents a side elevation of the front end of an internal combustion motor;

Figure 2 represents a front elevation of the vibration dampener shown in Figure 1;

Figure 3 represents a sectional view taken along a plane indicated by the line 3—3 in Figure 2 and looking in the direction of the arrows;

Figure 4 represents a front elevational view of the insulating gasket shown in Figures 2 and 3 and prior to assembly with the dampener;

Figure 5 represents a sectional view taken along a plane indicated by the line 5—5 in Figure 4 and looking in the direction of the arrows;

Figure 6 represents a sectional view through one of the connecting bolt grommets shown in Figure 3 showing the grommet in unstressed position and shape;

Figure 7 represents a sectional view similar to that shown in Figure 3 but illustrating a modified form of the invention;

Figure 8 represents a front elevational view of one of the insulator gaskets shown in Figure 7;

Figure 9 represents a side elevational view of the gasket shown in Figure 8; and Figure 10 represents a front elevational view of the friction plate shown in Figure 7.

Figure 1 shows the front end of an internal combustion motor 11 having a crank shaft 12 which projects forwardly of the motor and to which is attached the vibration dampener generally indicated at 13. The dampener 13 also acts as a pulley to carry the belt 14 which drives the fan 15 and generator 16.

In the embodiment of the invention illustrated in Figures 2 to 6, there is shown a hub 17 which is secured to the front end of the crank shaft 12 by means of a cap screw 18. Carried by the hub 17 is the inertia member 19 which is provided with a pulley groove 20 around which a fan belt 14 may turn to drive the fan 15 and generator 16. The inertia member 19 is also provided with a balance hole 21 which is formed by drilling material from the inertia member to correct the static and dynamic balance of the crank shaft and inertia member assembly. The balance hole 21 is preferably cut after the dampener has been installed on the crank shaft and tested for balance in the well known manner used in motor part production today.

More specifically the hub 17 consists of cylindrical portion 22 arranged to fit around the crank shaft 12 and in which is formed a key way 24 which carries the key 26 to rotatably connect the hub to the crank shaft. Forwardly of the cylindrical portion 22 is formed an enlarged cylindrical portion 28 joined with the smaller cylindrical portions by an interior beveled surface 30. The cap screw 18 draws a washer 31 against the beveled surface 30 to retain the hub on the crank shaft. Suitable sealing gaskets and washers 32 are provided between the washer 31 and the hub 17 to prevent oil from leaking forwardly along the crank shaft from the interior of the motor.

The forward edge of the enlarged cylindrical portion 28 carries a flat annular flange portion 34 which defines a series of apertures 36 equally spaced around the center of the hub. These apertures 36 are arranged to receive and pass the reduced portions 38 of the bolts 40 so that the shoulders 42 bear against the inner surface of the annular flange 34. The bolts 40 are retained in place by the nuts and lock washers 44.

Considering more specifically the construction of the inertia member 19, the rim portion 46 which forms the main body of the inertia member is provided with an interior annular flange portion 48 in the back face of which are cut a series of equally spaced pockets 50 which are arranged to receive the rubber or other deformable grommets 52. The bottom wall of each pocket 50 defines a smaller aperture 54 in the center thereof, which apertures are arranged to pass the shanks of the bolts 40. It will be noted that the apertures 54 are larger in diameter than the bolts 40 to provide ample clearance between the bolts and the inertia member 19.

The forward face of the inertia member 19 is provided with a forwardly extending cylindrical flange 56 which surrounds and is slightly spaced from the periphery of the annular flange 34 formed on the hub 17. A gasket generally indicated at 58 is positioned between the balance weight 16 and the hub 10 in a manner which will be more particularly described presently. The bolts 40 extend through the grommets 52 and compress the grommets in the apertures 50, thus expanding them into tight contact with the walls of the pockets 50 and drawing the inertia member forwardly against the rear surface of the annular flange 34. The shoulders 42 on the bolts 40 set a predetermined limit to the compression which may be applied to the grommets 52 so that any number of vibration dampeners may be assembled with the same characteristics.

The gasket 58 is more particularly shown in Figures 4 and 5 and consists of a flat rubber disc having a central portion 60 defining a center aperture 62 and surrounded by an outer portion 64 defining a series of apertures 66. It will be noted that the central aperture 62 is of considerably smaller diameter than the outer diameter of the enlarged cylindrical portion 28 of the hub 17; however, when the inner portion 60 of the gasket is stretched over the enlarged cylindrical portion 28 of the hub, the rubber deforms and takes the shape of a thin cylinder covering the enlarged cylindrical portion 28. The outer portion 64 of the gasket 58 being unstressed by this stretching operation of the center portion 60, continues to lie in a generally flat plane along the rear surface of the annular flange 34 with the apertures 66 registering with the apertures 36 in the flange.

When the inertia member 16 is assembled on the hub 10, the inner cylindrical surface of the annular flange 48 will further stretch out and decrease the thickness of the center portion 60 of the gasket 58 and will press the outer portion 64 against the annular flange 34. As was explained before, the bolts 40 may be secured in place and tightened to a predetermined degree by the nuts 44. The vibration dampener is then ready for installation on the crank shaft 12.

Particular attention is called to the manner in which the center portion 60 of the rubber gasket is stretched over the outer cylindrical surface of the enlarged portion 28 of the hub and the manner in which the inertia member is installed over the gasket. The thickness of the gasket in its unstretched condition is considerably greater than the clearance between the hub and inertia member. By way of example, if the clearance is .030 inch, the thickness of the gasket may be .060 inch. Stretching the gasket over the hub reduces the thickness of the gasket somewhat, the greatest reduction taking place toward the rear of the hub so that the inertia member may be started over the gasket without rolling up the gasket before it. As the inertia member is forced forwardly on the hub, it will stretch out the remainder of the central portion of the gasket, thus assuring that the clearance between the hub and inertia member will be tightly filled with stretched rubber. This connection entirely insulates the inertia member from the hub and still allows slight relative rotation between the members while holding the inertia member against transverse oscillation. After the rubber gasket has been installed between the two parts of the dampener for some time, it becomes bonded to the metal due to pressure applied to it.

It will be noted that the connecting bolts 40 are insulated from the inertia member 19 by the grommets 52. It will further be noted that the dynamic forces which will be set up by rotation of the unbalanced inertia member and tending to oscillate transversely of the hub will not be transmitted to the hub entirely through the center portion 60 of the gasket 58. The grommets 52 and bolts 40 will also carry a portion of this load while the outer portion 64 of the gasket 58 will also transmit a portion of this force in the form of shear loads applied to the rear face of the annular flange 34 and to the outer edges of the annular flange. It is thus assured that the inertia member 19 will not knock against the hub 17 or wear out the center portion 60 of the gasket 58. The enlarged apertures 54 through which the bolts 40 pass allow the inertia member 19 to have limited rotation relative to the hub 17 so that it may function to absorb torsional vibrations from the crank shaft 12 in the normal fashion.

In the modification of the invention shown in Figures 7 through 10, which is the preferred form of the invention, the hub 117 and inertia member 119 are the same in all respects as the corresponding hub and inertia member shown in Figures 2 and 3 except that the inertia member has no cylindrical flange corresponding to the flange 56 on the member 19. The two members are connected by the same bolts 140 and rubber or other deformable grommets 152. The inertia member 119 is, however, separated from the hub 117 by a different type of gasket 158 which is more particularly illustrated in Figures 8 and 9 and a friction plate 159 which is more particularly illustrated in Figure 10.

It will be noted that the gasket 158 is smaller in diameter than the corresponding gasket 58 used in the first form of the invention and consists of a flat rubber disc of approximately the same size as the center portion 60 of the gasket 58. The center aperture 162 is the same size as the aperture 62 and the thickness of the gasket 158 is the same as the thickness of the gasket 58. Thus when the gasket 158 is stretched over the hub 117, it will cover only the enlarged cylindrical portion 128 of the hub 117 and will not extend over the face of the annular flange 134.

The annular flange 134 is separated from the forward face of the inertia member 119 by a flat disc 159 which is formed of a relatively hard, wear resistant, friction material such as clutch facing material. The disc 159 is of approximately the same size and shape as the outer portion 64 of the gasket 58 used in the first form of the invention.

The substitution of the friction plate 159 for the outer portion 64 of the rubber gasket 58 increases the wear resistant properties of the insulator between the hub and inertia member of the vibration dampener and also increases the friction connection between the inertia member and the hub so that the tendency of the inertia member to rotate relative to the hub and crank shaft is more quickly transmitted to the hub through the friction plate 159 to transmit to or absorb energy from the crank shaft and hub, thus giving a more perfect dampening of the torsional vibrations in the crank shaft. The small gasket 158 functions to securely mount the inertia member 119 on the hub 117 in the same manner in which the center portion 60 of the gasket 58 secures the inertia member 19 to the hub 17.

While we have described our invention in some detail, we intend this description to be an example only and not as a limitation of our invention, to which we make the following claims:

1. A vibration dampener comprising a flanged hub member having an outside diameter and an inertia member having an internal diameter and a flat face, said diameters and the flat faces of said flange and inertia member being joined together by a deformable insulating sleeve, said insulating sleeve being stressed by forces applied axially of the axis of rotation of said dampener, and securing means holding said members together and exerting said forces.

2. A vibration dampener comprising a hub having an outer cylindrical surface, an annular flange extending radially outwardly from said hub, an inertia member defining an aperature and positioned with said cylindrical surface extended through said aperture, an annular face on said inertia member positioned adjacent to said annular flange on said hub, a gasket formed of deformable material and having a central portion defining an aperture which in unstressed condition is smaller in diameter than the diameter of the cylindrical surface of said hub, said gasket having its apertured portion stretched over said cylindrical surface of said hub and between said hub and said inertia member and having exterior portions positioned between said annular flange and said annular face, and means extending between said inertia member and said annular flange to assist in holding said inertia member and hub together.

3. A vibration dampener comprising a hub having an outer cylindrical surface, an annular flange extending radially outwardly from said hub, an inertia member defining an aperture and positioned with said cylindrical surface extended through said aperture, an annular face on said inertia member positioned adjacent to said annular flange on said hub, a gasket formed of deformable material and having a central portion defining an aperture which in unstressed condition is smaller in diameter than the diameter of the cylindrical surface of said hub, said gasket having its apertured portion stretched over said cylindrical surface of said hub and between said hub and said inertia member and having exterior portions positioned between said annular flange and said annular face, deformable grommets carried by said inertia member, and clamping means extending through said grommets and said annular flange to assist in holding said hub and inertia member together.

4. A vibration dampener comprising a hub having an outer cylindrical surface, an annular flange extending radially outwardly from said hub, an inertia member defining an aperture and positioned with said cylindrical surface extending through said aperture, an annular face on said inertia member positioned adjacent to said annular flange on said hub, a gasket formed of flat deformable material and having a central portion defining an aperture which in unstressed condition is smaller in diameter than the diameter of the cylindrical surface of said hub, said gasket in unstressed condition being thicker than the clearance between said cylindrical surface and said inertia member and having its apertured portion stretched over said cylindrical surface of said hub and between said hub and said inertia member to a thickness equal to said clearance and having exterior portions positioned between said annular flange and said annular face, and clamping means extending between said inertia member and said annular flange to assist in holding said inertia member and hub together.

5. A vibration dampener comprising a hub member having a cylindrical outer surface and a portion defining a flat annular flange, an inertia member defining a cylindrical aperture and having a portion defining a flat annular surface, said aperture being of slightly larger diameter than the diameter of said cylindrical surface of said hub and being positioned therearound, a gasket formed of deformable material defining an aperture which in unstressed condition is of smaller diameter than the diameter of said cylindrical surface of said hub, said gasket having its apertured portion stretched over said cylindrical surface and positioned between said hub and said inertia member and between said annular surfaces, one of said flat annular portions defining a series of pockets equally spaced around the axis of said hub, deformable grommets positioned in said pockets, and clamping means insulated from said first flat annular portion by said grommets and extending through said other of said flat annular portions to assist in holding said members together.

6. A vibration dampener comprising a hub member having a cylindrical outer surface and a portion defining a flat annular flange, an inertia member defining a cylindrical aperture and having a portion defining a flat annular surface, said aperture being of slightly larger diameter than the diameter of said cylindrical surface of said hub and being positioned therearound, a gasket formed of deformable material defining an aperture which in unstressed condition is of smaller diameter than the diameter of said cylindrical surface of said hub, a part of said gasket extending between said flat annular portions of said members, one of said flat annular portions defining a series of pockets equally spaced around the axis of said hub, resilient means positioned in said pockets, and clamping means insulated from said one annular member by said resilient means extending through said resilient means and the other of said flat annular portions to hold said members together.

7. A vibration dampener comprising a hub member having a cylindrical outer surface and a portion defining a flat annular surface, an inertia member defining a cylindrical aperture and having a flat annular portion, said aperture being of slightly larger diameter than the diameter of said cylindrical surface of said hub and being positioned therearound, a gasket formed of deformable material defining an aperture which in unstressed condition is of smaller diameter than the diameter of said cylindrical surface of said hub and being stretched thereover, a flat annular disc of friction material positioned between said flat annular portions of said members, one of said flat annular portions defining a series of pockets equally spaced around the axis of said hub, resilient means positioned in said pockets, and means extending through said resilient means and the other of said flat annular portions to assist in holding said members together.

8. A vibration dampener comprising a hub member having a cylindrical outer surface and a portion defining a flat annular surface, an inertia member defining a cylindrical aperture and having a flat annular portion, said aperture being of slightly larger diameter than the diameter of said cylindrical surface of said hub and being positioned therearound, a gasket of deformable material defining an aperture which in unstressed condition is of smaller diameter than the diameter of said cylindrical surface of said hub and being stretched thereover, a flat annular disc of friction material positioned between said flat annular portion of said members, one of said flat annular portions defining a series of pockets spaced around the axis of said hub, resilient means positioned in said pockets, and clamping means extending between said resilient means and the other of said flat annular portions to compress said resilient means and assist in holding said members together.

9. A vibration dampener assembly mounted on a shaft including an inertia member mounted upon a flanged hub for rotation in a plane perpendicular to the axis of the shaft and having an opening therein of greater diameter than that of the hub on which it is mounted, an initially flat disc-like flexible seating collar for the rigid inertia member having initially a concentric opening of less diameter than that of the hub which, when distended over the shaft and under compression within the opening of the inertia member, extends beyond the joint between the inertia member and hub and between the parallel flat faces of said flange and inertia member to cushion the adjacent faces of the inertia member and flange from one another, and additional resilient means joining said inertia member and hub.

10. The method of assembling a vibration dampener including a flanged hub and an inertia member comprising providing a flat disc-like expansible element having an opening of less diameter than the diameter of the hub, distorting the expansible element by expanding said opening therein over said hub to reduce the edge thickness of said element around said opening by the resultant stretching action, inserting the assembled hub and stretched expansible element in a central aperture in said inertia member, said inertia member aperture being of less diameter than the diameter of said hub plus twice the unstretched thickness of said flexible member, and finally forcing said inertia member to a seated position against the flange of said hub whereby a portion of said expansible element is seated in substantially a flat unstressed condition between said flange and inertia member and another portion of said expansible element is stretched into a highly stressed tubular condition between said hub and the walls of the inertia member aperture and of substantially uniform thickness.

11. The method of mounting a female member upon a rotary flanged male member, including disposing the female member in concentric relation upon the male member for unison rotation in a plane substantially perpendicular to the axis of rotation of the male member, providing in association therewith a flat disc-like expansible member having initially a concentric opening of less diameter than that of the male member, distorting the opening in said expansible member and the portion thereof surrounding said opening by forcing said male member into said opening, thereafter inserting the assembled male member and expansible element into the opening in said female member and forcing the members together to produce a joint in which that portion of the expansible element between the male and female members and the flange and female member is under a uniform compressive stress.

12. A joint between a collar and a rotatable cylindrical element having an annular flange, said collar having a central aperture of substantial extent along said rotatable cylindrical element and substantially uniform internal diameter and a forward face adjacent to the face of said flange, said aperture being of greater diameter than the diameter of said cylindrical element upon which it is mounted, and a flexible sleeve element between said members having an unstressed thickness greater than the clearance between said collar and element and being compressed in the assembly to a thickness equal to the clearance, said flexible element terminating at one end flush with an end face of said collar so as to exclude foreign material from the joint and retard aging of the flexible element and extending between said flange and the forward face of the collar to its other end.

13. A joint between a cylindrically surfaced flanged member and a telescopically arranged collar having a substantial internal cylindrical surface, comprising a deformable noise insulating element positioned between said parts and exerting radially directed force both upon the internal surface of said collar and on the cylindrical external diameter of said member of substantially equal unit pressure entirely along said surface and exerting longitudinally directed forces upon said flange and said collar, said insulating element terminating flush with an end surface of said collar.

NILS ERIK WAHLBERG.
FLOYD F. KISHLINE.

REFERENCES CITED

The following references are of record in the file of this patent:

UNITED STATES PATENTS

| Number | Name | Date |
| --- | --- | --- |
| 1,692,837 | Henry | Nov. 27, 1928 |
| 1,704,834 | Jansson | Mar. 12, 1929 |
| 1,730,799 | Bowes | Oct. 8, 1929 |
| 1,861,390 | Gunn | May 31, 1932 |
| 1,871,376 | Keys | Aug. 9, 1932 |
| 1,874,515 | Harris | Aug. 30, 1932 |
| 1,882,281 | Griswold | Oct. 11, 1932 |
| 1,941,061 | Thiry | Dec. 26, 1933 |
| 1,961,536 | Thiry | June 5, 1934 |
| 2,016,828 | Brownyer | Oct. 8, 1935 |
| 2,041,507 | Zeder | May 19, 1936 |
| 2,049,133 | Peirce | July 28, 1936 |
| 2,060,565 | Geyer | Nov. 10, 1936 |
| 2,083,561 | Griswold | June 15, 1937 |
| 2,110,783 | Welker | Mar. 8, 1938 |
| 2,115,427 | Olson | Apr. 26, 1938 |
| 2,153,914 | Christman | Apr. 11, 1939 |
| 2,201,932 | Tibbetts | May 21, 1940 |
| 2,224,478 | Jones | Dec. 10, 1940 |
| 2,248,405 | Freeman | July 8, 1941 |

FOREIGN PATENTS

| Number | Country | Date |
| --- | --- | --- |
| 542,880 | Great Britain | Jan. 30, 1942 |